US012770471B2

(12) United States Patent
Hufnagl-Abraham

(10) Patent No.: US 12,770,471 B2
(45) Date of Patent: Oct. 20, 2026

(54) GATEWAY TO BUILD FREE GAMES BONUS

(71) Applicant: IGT, Las Vegas, NV (US)

(72) Inventor: Klaus Hufnagl-Abraham, Graz (AT)

(73) Assignee: IGT, Las Vegas, NV (US)

( * ) Notice: Subject to any disclaimer, the term of this patent is extended or adjusted under 35 U.S.C. 154(b) by 297 days.

(21) Appl. No.: 18/416,515

(22) Filed: Jan. 18, 2024

(65) Prior Publication Data

US 2025/0239138 A1 Jul. 24, 2025

(51) Int. Cl.
*G07F 17/32* (2006.01)

(52) U.S. Cl.
CPC ................................ *G07F 17/3267* (2013.01)

(58) Field of Classification Search
CPC ......................... G07F 17/3267; G07F 17/3213
See application file for complete search history.

(56) References Cited

U.S. PATENT DOCUMENTS 8,147,334 B2 4/2012 Gatto et al.
8,764,566 B2 7/2014 Miltenberger et al.
2011/0117988 A1* 5/2011 DuBose .............. G07F 17/3206 463/20

* cited by examiner

*Primary Examiner* — Thomas H Henry
(74) *Attorney, Agent, or Firm* — Sheridan Ross P.C.

(57) ABSTRACT

Embodiments of the present disclosure are directed to providing a bonus-building session within an electronic game. According to one embodiment, a method for operating an electronic game can comprise executing a gaming session of an electronic game. The electronic game can comprise a plurality of operable features and each operable feature can comprise a plurality of symbols. A first predefined condition for the plurality of symbols on the plurality of operable features can be detect. The first predefined condition can correspond to a win of a free game within the gaming session. In response to detecting the first predefined condition and prior to initiation of the free game within the gaming session, gaming system, a bonus-building session can be provided within the gaming session. The bonus-building session can comprise a plurality of bonus-building games.

14 Claims, 6 Drawing Sheets

GATEWAY TO BUILD FREE GAMES BONUS

BACKGROUND

The present disclosure is generally directed to operating an electronic game and more particularly to providing a bonus-building session within the electronic game.

In a casino environment, games which provide an increased sense of improved chances to win or an ability to accumulate an available prize amount increase player engagement. Increased player engagement in turns leads to increased use of the game and revenues for the operator of the casino. Thus, there is a need to provide an increased sense of improved chances to win or an ability to accumulate an available prize amount in an electronic game.

BRIEF SUMMARY

Embodiments of the present disclosure are directed to providing a bonus-building session within an electronic game. According to one embodiment, a method for operating an electronic game can comprise executing a gaming session of an electronic game. The electronic game can comprise a plurality of operable features and each operable feature can comprise a plurality of symbols. A first predefined condition for the plurality of symbols on the plurality of operable features can be detected. The first predefined condition can correspond to a win of a free game within the gaming session. For example, the electronic game can comprise a slots game, the plurality of operable features can comprise a plurality of reels, and detecting the predefined condition can be based on the plurality of symbols appearing on the plurality of reels. In response to detecting the first predefined condition and prior to initiation of the free game within the gaming session, gaming system, a bonus-building session can be provided within the gaming session. The bonus-building session can comprise a plurality of bonus-building games.

The electronic game can comprise a progressive award and a win meter for the game can indicate an amount of the progressive award. During the bonus building session, a second predefined condition for the plurality of operable features can be detected. The second predefined condition can correspond to a win in the gaming session. In response to detecting the second predefined condition for the plurality of operable features, a win amount corresponding to the detected second predefined condition for the plurality of operable features can be added to a win meter for the electronic game.

The bonus-building session can be limited to a predefined number of consecutive bonus-building games in the plurality of bonus-building games available to a player of the electronic game without a win in the consecutive bonus-building games. In response to no win occurring within the predefined number of consecutive bonus-building games in the plurality of bonus-building games available to a player of the electronic game, the free game can be initiated.

The plurality of symbols can comprise a symbol indicating a multiplier amount. Presence of the symbol indicating the multiplier amount on a feature of the plurality of features can be detected during the bonus building session. In response to detecting the presence of the symbol indicating the multiplier amount on the feature of the plurality of features, the multiplier amount indicated by the detected symbol can be applied to a corresponding symbol in the free game.

According to another embodiment, a gaming system can comprise a processor and a memory coupled with and readable by the processor. The memory can store therein a set of instructions which, when executed by the processor, cause the processor to execute a gaming session of an electronic game. The electronic game can comprise a plurality of operable features and each operable feature can comprise a plurality of symbols. The instructions can further cause the processor to detect a first predefined condition for the plurality of symbols on the plurality of operable features. The first predefined condition can correspond to a win of a free game within the gaming session. For example, the electronic game can comprise a slots game, the plurality of operable features can comprise a plurality of reels, and detecting the predefined condition can be based on the plurality of symbols appearing on the plurality of reels. In response to detecting the first predefined condition and prior to initiation of the free game within the gaming session, the instructions can further cause the processor to provide a bonus-building session within the gaming session, the bonus-building session comprising a plurality of bonus-building games.

The bonus-building session can be limited to a predefined number of consecutive bonus-building games in the plurality of bonus-building games available to a player of the electronic game without a win in the consecutive bonus-building games. In such cases, the instructions can further cause the processor to, in response to no win occurring within the predefined number of consecutive bonus-building games in the plurality of bonus-building games available to a player of the electronic game, initiate the free game.

The instruction further cause the processor to detect a second predefined condition for the plurality of operable features. The second predefined condition can correspond to a win in the gaming session. In response to detecting the second predefined condition for the plurality of operable features, the instructions can further cause the processor to add a win amount corresponding to the detected second predefined condition for the plurality of operable features to a win meter for the electronic game. For example, the electronic game comprises a progressive award and the win meter can indicate an amount of the progressive award.

The plurality of symbols can comprise a symbol indicating a multiplier amount. In such cases, the instruction can further cause the processor to detect presence of the symbol indicating the multiplier amount on a feature of the plurality of features and in response to detecting the presence of the symbol indicating the multiplier amount on the feature of the plurality of features, apply the multiplier amount indicated by the detected symbol to a corresponding symbol in the free game.

According to yet another embodiment, a non-transitory, computer-readable medium can comprise a set of instructions stored therein which, when executed by a processor, causes the processor to execute a gaming session of an electronic game. The electronic game can comprise a plurality of operable features and each operable feature can comprise a plurality of symbols. The instructions can further cause the processor to detect a first predefined condition for the plurality of symbols on the plurality of operable features. The first predefined condition can correspond to a win of a free game within the gaming session. For example, the electronic game can comprise a slots game, the plurality of operable features can comprise a plurality of reels, and detecting the predefined condition can be based on the plurality of symbols appearing on the plurality of reels. In response to detecting the first predefined condition and prior to initiation of the free game within the gaming session, the instructions can further cause the processor to provide a bonus-building session within the gaming session, the bonus-building session comprising a plurality of bonus-building games.

The bonus-building session can be limited to a predefined number of consecutive bonus-building games in the plurality of bonus-building games available to a player of the electronic game without a win in the consecutive bonus-building games. In such cases, the instructions can further cause the processor to, in response to no win occurring within the predefined number of consecutive bonus-building games in the plurality of bonus-building games available to a player of the electronic game, initiate the free game.

The instruction further cause the processor to detect a second predefined condition for the plurality of operable features. The second predefined condition can correspond to a win in the gaming session. In response to detecting the second predefined condition for the plurality of operable features, the instructions can further cause the processor to add a win amount corresponding to the detected second predefined condition for the plurality of operable features to a win meter for the electronic game. For example, the electronic game comprises a progressive award and the win meter can indicate an amount of the progressive award.

The plurality of symbols can comprise a symbol indicating a multiplier amount. In such cases, the instruction can further cause the processor to detect presence of the symbol indicating the multiplier amount on a feature of the plurality of features and in response to detecting the presence of the symbol indicating the multiplier amount on the feature of the plurality of features, apply the multiplier amount indicated by the detected symbol to a corresponding symbol in the free game.

Additional features and advantages are described herein and will be apparent from the following Description and the figures.

DETAILED DESCRIPTION

Embodiments of the present disclosure are directed to providing a bonus-building session within an electronic game such as a slots game. According to one embodiment, when a player of the game wins one or more free games, a bonus-building session can be initiated. In the bonus building session, a number of free, bonus-building games or spins can be played. Wins in the bonus-building game can be applied to a progressive prize in the electronic game. Additionally, or alternatively, multipliers hit in the bonus-building games can be applied when the free games are played. The bonus-building session can continue until it expires. The bonus-building session can expire, for example, after a predetermined consecutive number of bonus-building games or spins have been played without a win. In this way, the game can provide an increased sense of improved chances to win or an ability to accumulate an available prize amount thereby increasing player engagement, encouraging continued and/or more frequent play, and increasing revenues generated by the game.

Figure 1:
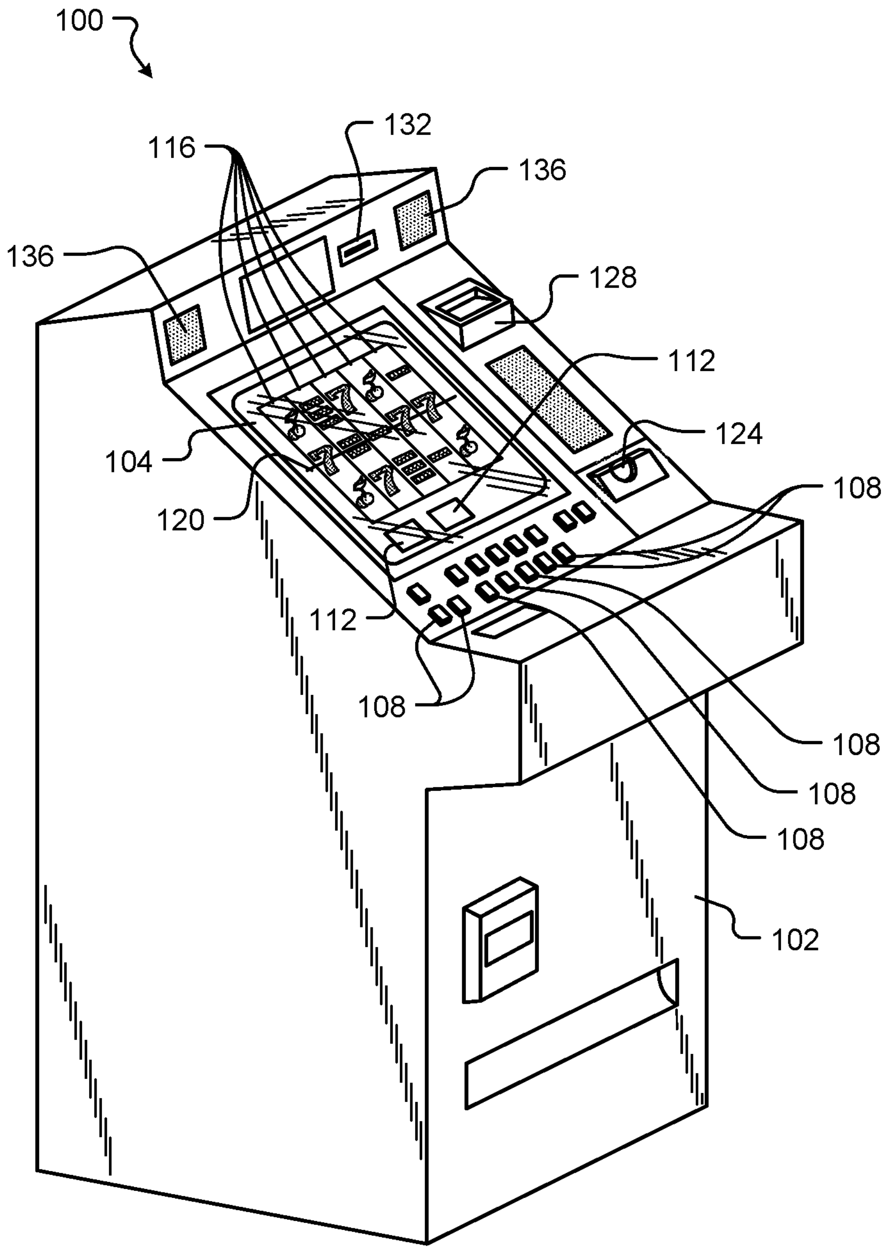
FIG. 1 is a diagram illustrating an exemplary gaming system in which embodiments of the present disclosure may be implemented.

FIG. 1 is a diagram illustrating an exemplary gaming system in which embodiments of the present disclosure may be implemented. More specifically, FIG. 1 illustrates a gaming system 100 that may be used to implement a hold and re-spin game or the like. A gaming system 100 may include a portable or non-portable device used for executing a gaming application or multiple different gaming applications without departing from the scope of the present disclosure. Non-limiting examples of a gaming system can include, but are not limited to, an EGM, a Video Gaming Machine (VGM), a mobile communication device (e.g., a smartphone, laptop, tablet, wearable device, etc.), a personal computer (PC), etc. An EGM or VGM-type of gaming system 100 is shown in FIG. 1 in accordance with embodiments of the present disclosure.

The illustrative gaming system 100 of FIG. 1 is shown to include a support structure, housing or cabinet 102 which provides support for a plurality of displays, inputs, controls and other features of a conventional gaming machine. In the illustrated embodiment, a player can play the gaming system 100 while sitting. However, the gaming system 100 can be alternatively configured so that a player can operate it while standing or sitting. The illustrated gaming system 100 can be positioned on the floor but can be positioned alternatively (i) on a base or stand, (ii) as a pub-style table-top game, (iii) as a stand-alone gaming system on the floor of a casino with other stand-alone gaming system, or (iv) in any other suitable manner. The gaming system 100 can be constructed with varying cabinet and display configurations.

In one embodiment, a gaming system 100 can be configured to randomly generate awards and/or other game outcomes based on probability data. Since a gaming system 100 can generate outcomes randomly or based upon a probability calculation, there is no certainty that the gaming system 100 will provide the player with any specific award or other game outcome.

In some embodiments, a gaming system 100 may employ a predetermined or finite set or pool of awards, progressive awards, prizes or other game outcomes. In such an embodiment, as each award or other game outcome is provided to the player, the gaming system 100 removes the provided award or other game outcome from the predetermined set or pool. Once removed from the set or pool, the specific provided award or other game outcome cannot be provided to the player again. The gaming system 100 may provide players with some or all of the available awards or other game outcomes over the course of a play cycle and may or may not guarantee a designated number of actual wins and losses.

The gaming system 100 may include one or more displays 112. An illustrative display 112 may include a credit display that displays a player's current number of credits, cash, account balance or the equivalent. Another illustrative display 112 may include a bet display that displays a player's amount wagered.

The gaming system 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the gaming system 100.

In one embodiment, a player inserts an identification card into card reader 132 of gaming system 100. The identification card can be a smart card having a programmed microchip or a magnetic strip coded with a player's identification, credit totals, and other relevant information. In one embodiment, money may be transferred to a credit meter of the gaming system 100 through an electronic fund transfer and card reader 132 using the player's credit, debit, or smart card. When a player funds the gaming system 100, a processor of the gaming system 100 may determine the amount of funds entered and the corresponding amount is shown on the credit or other suitable display 112 as described herein.

In one embodiment, after appropriate funding of gaming system 100, the player presses an input device 108 to initiate game play. The input devices 108 may include various types of buttons, levers, gesture inputs, cameras, etc., that enable a player to start any game play or sequence of events. In one embodiment, upon appropriate funding, gaming system 100 begins game play automatically. In another embodiment, the player may be required to actuate or activate one of the play buttons to initiate play of gaming system 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The gaming system 100 may include other suitable wager buttons, such as a "repeat bet" button (e.g., repeating the bet made from the immediately last play of the gaming system 100 for the next play of the gaming system 100), one or more "select paylines" buttons, a "select re-spin operation" button, and one or more "select wager per payline" buttons.

Another type of input device 108 that may be provided on the gaming system 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The gaming system 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a gaming system 100 can provide dynamic sounds coupled with attractive multimedia images displayed on the display screen 104 to provide an audio-visual representation or to otherwise display full-motion video with sound to attract players to the gaming system 100. During idle periods, the gaming system 100 displays a sequence of audio and/or visual attraction messages to attract potential players to the gaming system 100.

In one embodiment, a base or primary game can include a slot game with one or more paylines 120. As will be discussed in further detail herein, the game provided by the gaming system 100 may support one or multiple paylines 120, which may extend across the display screen 104 vertically, horizontally, diagonally, at adjusted angles, etc. In some embodiments, such as for a slot game, a payline 120 intersects a plurality of features, i.e., a plurality of reels 116, such as three to five reels. Each reel 116 may be used to display different sets of symbols in connection with game play activity provided by the gaming system 100. In some embodiments, each reel 116 may operate independent of all other reels and the symbols displayed by a reel 116 at the end of a given spin may depend upon random numbers generated by the gaming system 100. The positions of symbols on each reel 116 and in the combination of reels 116 may form the array of symbols distributed throughout an array of cells. The distribution of symbols may be presented in a presentation order rendered to the display screen 104 of the gaming system 100.

The reels 116 may be provided in video form with simulated reels being displayed via the display screen 104. A reel 116 may be used to display any number of symbols such as bells, hearts, fruits, numbers, letters, bars or other images and symbols, which could correspond to a theme associated with a game provided by the gaming system 100. The gaming system 100 may be configured to award prizes, awards, or other game play opportunities when the reels 116 stop spinning and a particular symbol combination is intersected by an active payline 120 (e.g., a payline 120 that is currently being wagered and is subject to evaluation for a win after the reels 116 have stopped spinning and a distribution of symbols is finalized).

Figure 2:
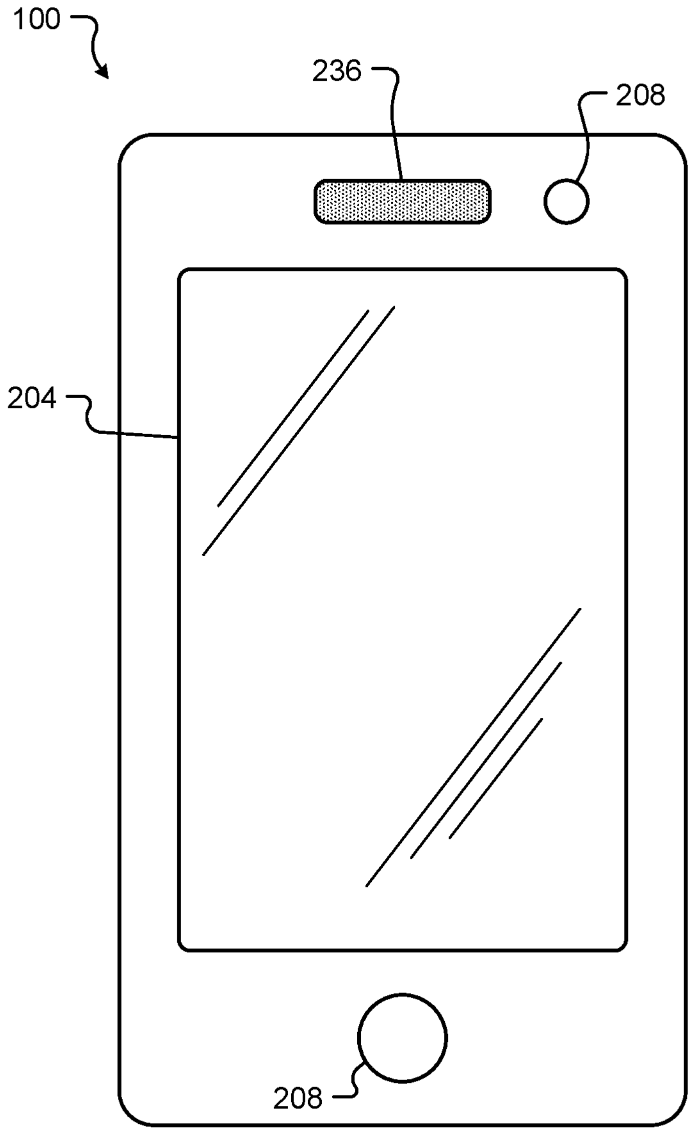
FIG. 2 is a diagram illustrating another exemplary gaming system in which embodiments of the present disclosure may be implemented.

FIG. 2 is a diagram illustrating another exemplary gaming system in which embodiments of the present disclosure may be implemented. As illustrated in this example, the gaming system 100 may be implemented by software executing on a portable gaming system 100 such as a mobile smartphone, tablet, wearable, etc. The gaming system 100 may be owned by a user of the device rather than being owned by a casino operator. In other embodiments, the portable gaming system 100 may be owned by a casino operator and provided to a player for an amount of time, possibly under an agreement between the casino operator and the player. As an example, the portable gaming system 100 may be assigned to the player for a duration of their visit or stay at the casino, but the portable gaming system 100 may be returned by the player back to the casino operator after the visit or stay has concluded.

The gaming system 100 includes a display screen 204, a plurality of input devices 208, and at least one speaker 236. In some embodiments, the display screen 204 may correspond to a touch-sensitive display screen, meaning that the display screen 204 is simultaneously capable of displaying information (e.g., in connection with game play activity) and receiving a user input. In some embodiments, the touch-sensitive display screen 204 may provide game features similar to a cabinet-style gaming system 100 without requiring all of the dedicated buttons provided by a cabinet-style gaming system 100.

Figure 3:
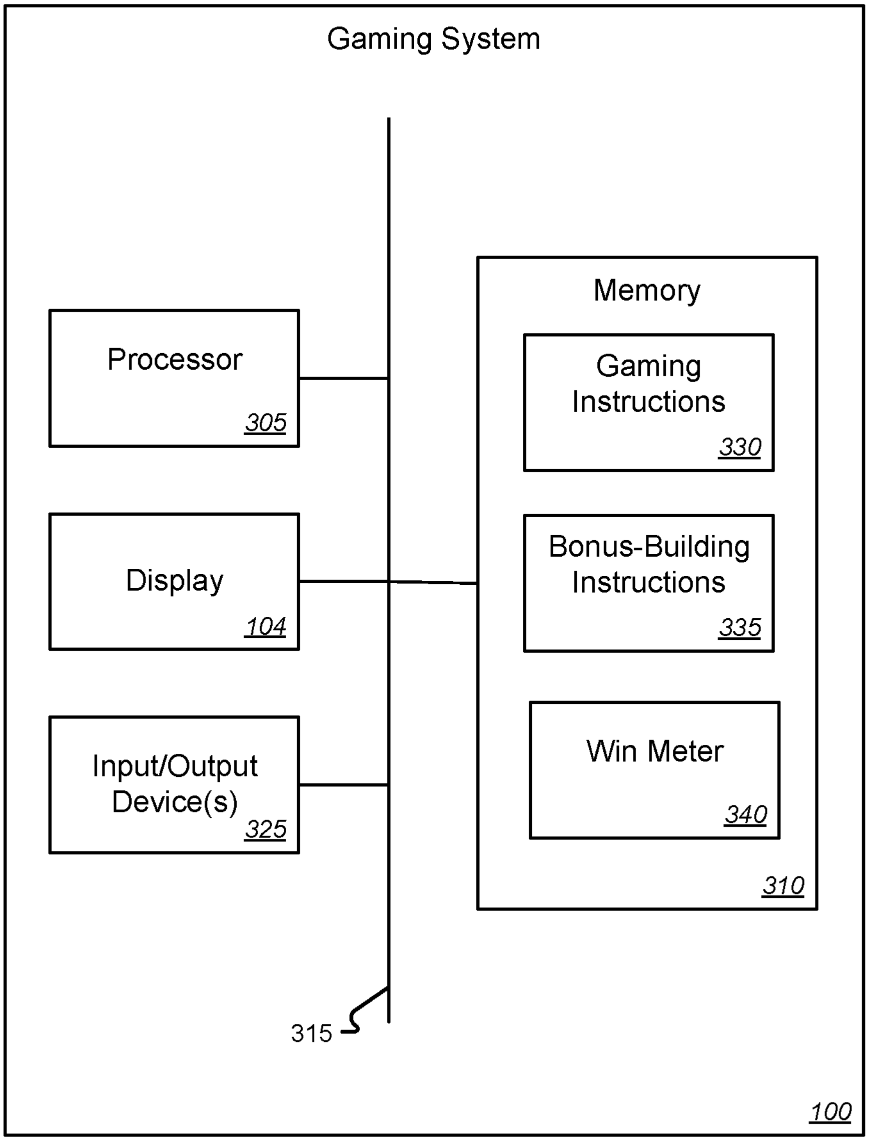
FIG. 3 is a block diagram illustrating additional details of components of an exemplary gaming system according to one embodiment of the present disclosure.

FIG. 3 is a block diagram illustrating additional details of components of an exemplary gaming system according to one embodiment of the present disclosure. As illustrated in this example, a gaming system 100 can comprise a processor 305. The processor 305 may correspond to one or many computer processing devices. For instance, the processor 305 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 305 may be provided as a microprocessor, Central Processing Unit (CPU), or plurality of microprocessors that are configured to execute the instructions sets stored in a memory 310. Upon executing the instruction sets stored in memory 310, the processor 305 enables various functions of the gaming system 100 as described herein.

The memory 310 can be coupled with and readable by the processor 305 via a communications bus 315. The memory 310 may include any type of computer memory device or collection of computer memory devices. Non-limiting examples of memory 310 include Random Access Memory (RAM), Read Only Memory (ROM), flash memory, Electronically-Erasable Programmable ROM (EEPROM), Dynamic RAM (DRAM), etc. The memory 310 may be configured to store the instruction sets depicted in addition to temporarily storing data for the processor 305 to execute various types of routines or functions.

The processor 305 can also be coupled with one or more communication interfaces 320, a display 104, and one or more input/output devices 325 via the communications bus 315. The communication interfaces 320 can comprise, for example, a Bluetooth, WiFi, cellular, and/or other type of wireless communications interface. The display 104 can comprise a device such as a Liquid Crystal Display (LCD), Light Emitting Diode (LED), Organic Light Emitting Diode (OLED), or other type of display. The input/output devices 325 can include, but are not limited to various buttons, a speaker, lights, etc.

The memory 310 can store therein a set of gaming instructions 330 which, when executed by the processor 305, cause the processor 305 to execute a gaming session of an electronic game and present a representation of the game one the display 104. The electronic game can comprise a plurality of operable features and each operable feature can comprise a plurality of symbols. The memory 310 can further store therein a set of bonus-building instructions 335 which, when executed by the processor 305, can further cause the processor 305 to detect a first predefined condition for the plurality of symbols on the plurality of operable features. The first predefined condition can correspond to a win of a free game within the gaming session. For example, the electronic game can comprise a slots game, the plurality of operable features can comprise a plurality of reels 116, and detecting the predefined condition can be based on the plurality of symbols appearing on the plurality of reels. In response to detecting the first predefined condition and prior to initiation of the free game within the gaming session, the bonus-building instructions 335 can further cause the processor 305 to provide a bonus-building session within the gaming session, the bonus-building session comprising a plurality of bonus-building games.

The bonus-building session can be limited to a predefined number of consecutive bonus-building games in the plurality of bonus-building games available to a player of the electronic game without a win in the consecutive bonus-building games. In such cases, the bonus-building instructions 335 can further cause the processor 305 to, in response to no win occurring within the predefined number of consecutive bonus-building games in the plurality of bonus-building games available to a player of the electronic game, initiate the free game.

The bonus-building instructions 335 can further cause the processor 305 to detect a second predefined condition for the plurality of operable features. The second predefined condition can correspond to a win in the gaming session. In response to detecting the second predefined condition for the plurality of operable features, the bonus-building instructions 335 can further cause the processor 305 to add a win amount corresponding to the detected second predefined condition for the plurality of operable features to a win meter 340 for the electronic game. For example, the electronic game can comprise a progressive award and the win meter 340 can indicate an amount of the progressive award.

The plurality of symbols can comprise a symbol indicating a multiplier amount. In such cases, the bonus-building instructions 335 can further cause the processor 305 to detect presence of the symbol indicating the multiplier amount on a feature of the plurality of features and in response to detecting the presence of the symbol indicating the multiplier amount on the feature of the plurality of features, apply the multiplier amount indicated by the detected symbol to a corresponding symbol in the free game.

Figure 4:
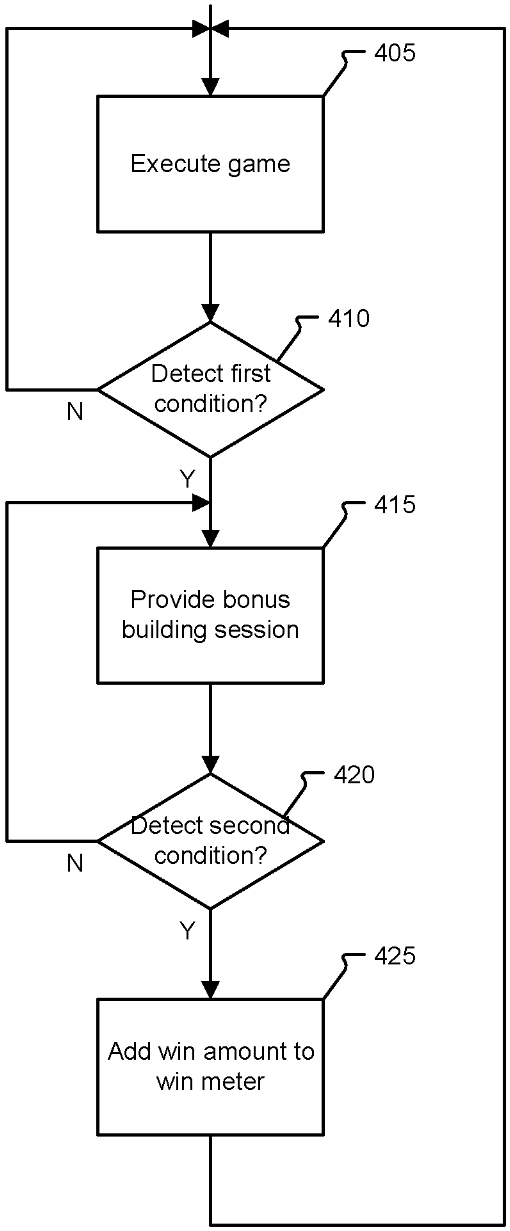
FIG. 4 is a flowchart illustrating an exemplary process for operating an electronic game according to one embodiment of the present disclosure.

FIG. 4 is a flowchart illustrating an exemplary process for operating an electronic game according to one embodiment of the present disclosure. As illustrated in this example, operating an electronic game can comprise executing 405 a gaming session of an electronic game. The electronic game can comprise a plurality of operable features and each operable feature can comprise a plurality of symbols. A first predefined condition for the plurality of symbols on the plurality of operable features can be detected 410. The first predefined condition can correspond to a win of a free game within the gaming session. For example, the electronic game can comprise a slots game, the plurality of operable features can comprise a plurality of reels 116, and detecting the predefined condition can be based on the plurality of symbols appearing on the plurality of reels 116. In response to detecting 410 the first predefined condition and prior to initiation of the free game within the gaming session. a bonus-building session can be provided 415 within the gaming session. The bonus-building session can comprise a plurality of bonus-building games.

The electronic game can comprise a progressive award and a win meter 340 for the game can indicate an amount of the progressive award. During the bonus building session, a second predefined condition for the plurality of operable features can be detected 420. The second predefined condition can correspond to a win in the gaming session. In response to detecting 420 the second predefined condition for the plurality of operable features, a win amount corresponding to the detected second predefined condition for the plurality of operable features can be added 425 to a win meter 340 for the electronic game.

Figure 5:
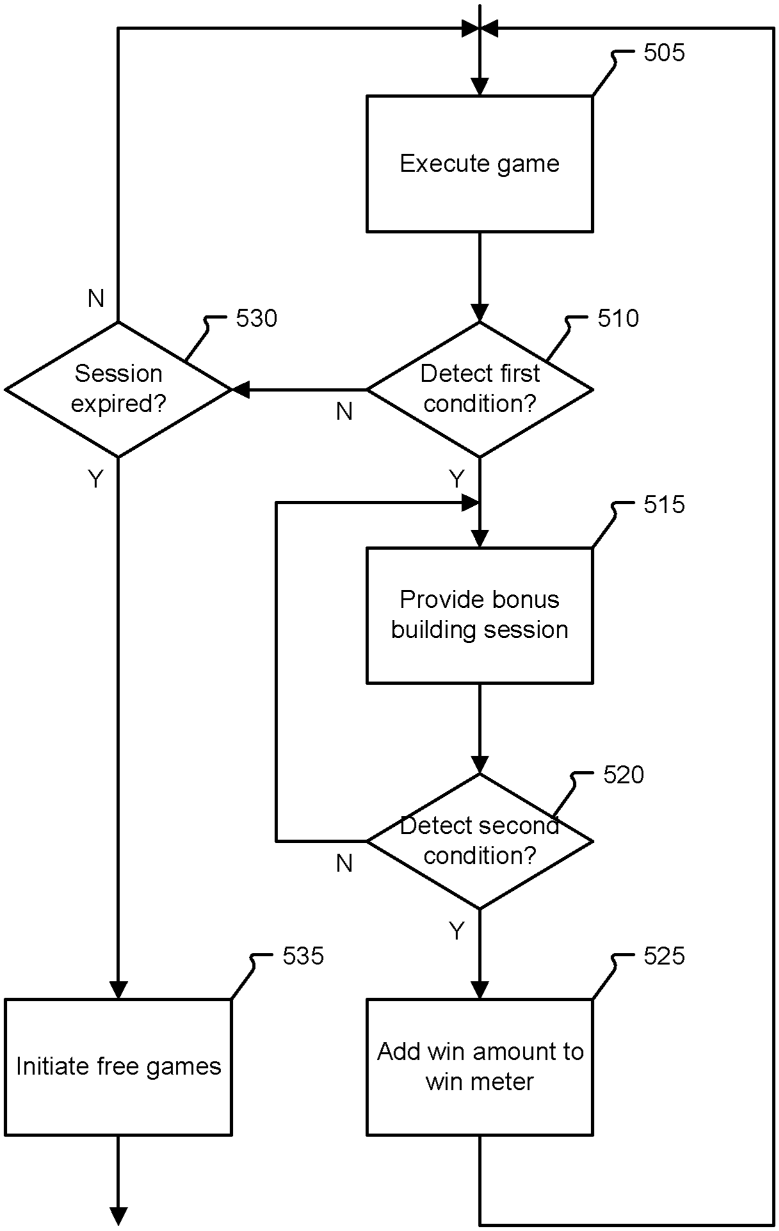
FIG. 5 is a flowchart illustrating an exemplary process for operating an electronic game according to another embodiment of the present disclosure.

FIG. 5 is a flowchart illustrating an exemplary process for operating an electronic game according to another embodiment of the present disclosure. As illustrated in this example, operating an electronic game can comprise executing 505 a gaming session of an electronic game. The electronic game can comprise a plurality of operable features and each operable feature can comprise a plurality of symbols. A first predefined condition for the plurality of symbols on the plurality of operable features can be detected 510. The first predefined condition can correspond to a win of a free game within the gaming session. For example, the electronic game can comprise a slots game, the plurality of operable features can comprise a plurality of reels 116, and detecting the predefined condition can be based on the plurality of symbols appearing on the plurality of reels 116. In response to detecting 510 the first predefined condition and prior to initiation of the free game within the gaming session. a bonus-building session can be provided 515 within the gaming session. The bonus-building session can comprise a plurality of bonus-building games.

The electronic game can comprise a progressive award and a win meter 340 for the game can indicate an amount of the progressive award. During the bonus building session, a second predefined condition for the plurality of operable features can be detected 520. The second predefined condition can correspond to a win in the gaming session. In response to detecting 520 the second predefined condition for the plurality of operable features, a win amount corresponding to the detected second predefined condition for the plurality of operable features can be added 525 to a win meter 340 for the electronic game.

The bonus-building session can be limited to a predefined number of consecutive bonus-building games in the plurality of bonus-building games available to a player of the electronic game without a win in the consecutive bonus-building games. In response to determining 510 that the first condition, i.e., a win, has not occurred, a further determination 530 can be made as to whether the bonus-building session has expired, e.g., based on the predefined number of consecutive bonus-building games available to a player of the electronic game without a win. In response to determining 530 that no win occurred within the predefined number of consecutive bonus-building games in the plurality of bonus-building games available to a player of the electronic game, the free game can be initiated 535.

Figure 6:
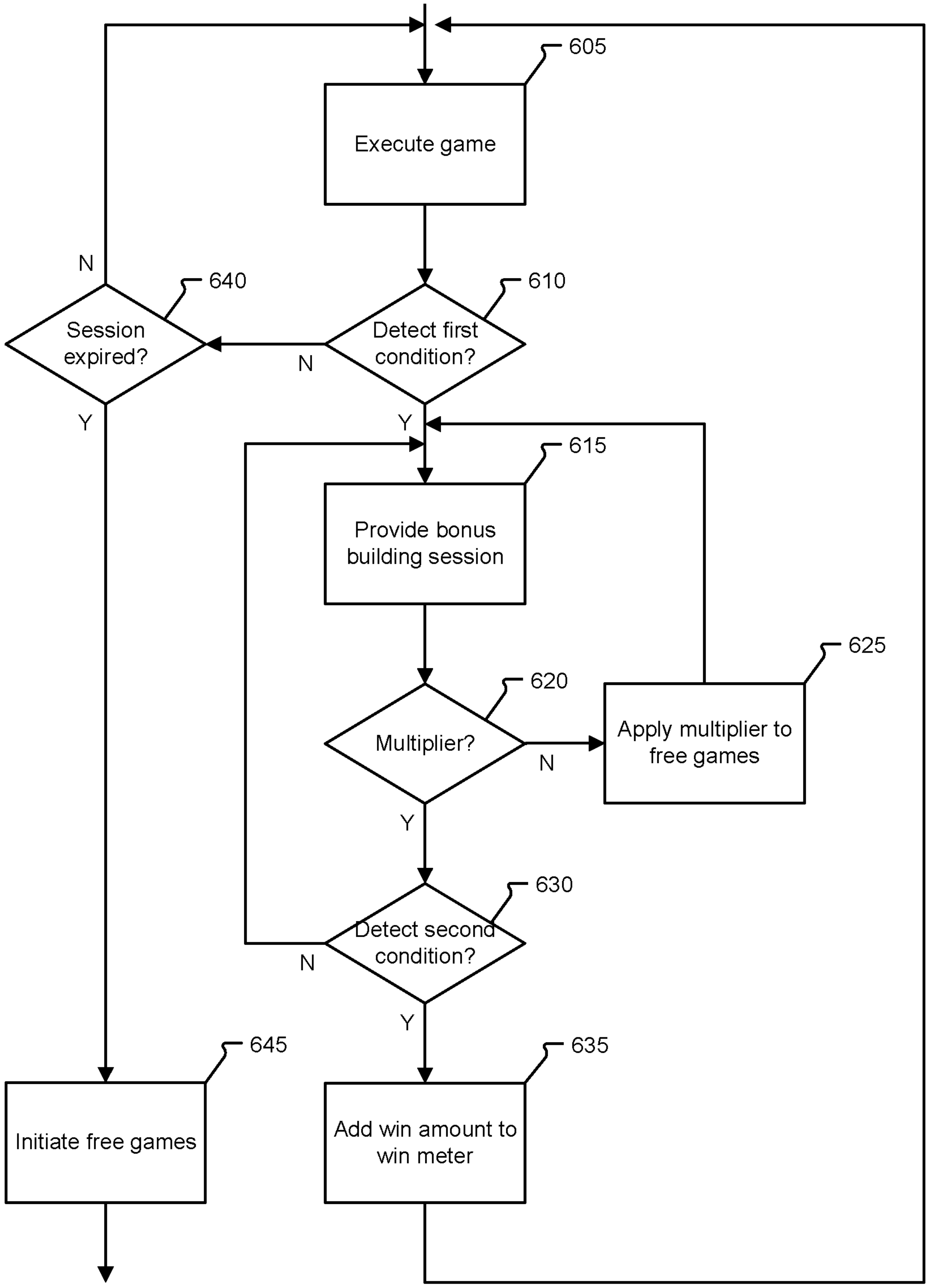
FIG. 6 is a flowchart illustrating an exemplary process for operating an electronic game according to yet another embodiment of the present disclosure.

FIG. 6 is a flowchart illustrating an exemplary process for operating an electronic game according to yet another embodiment of the present disclosure. As illustrated in this example, operating an electronic game can comprise executing 605 a gaming session of an electronic game. The electronic game can comprise a plurality of operable features and each operable feature can comprise a plurality of symbols. A first predefined condition for the plurality of symbols on the plurality of operable features can be detected 610. The first predefined condition can correspond to a win of a free game within the gaming session. For example, the electronic game can comprise a slots game, the plurality of operable features can comprise a plurality of reels 116, and detecting the predefined condition can be based on the plurality of symbols appearing on the plurality of reels 116. In response to detecting 610 the first predefined condition and prior to initiation of the free game within the gaming session. a bonus-building session can be provided 615 within the gaming session. The bonus-building session can comprise a plurality of bonus-building games.

The plurality of symbols can comprise a symbol indicating a multiplier amount. Presence of the symbol indicating the multiplier amount on a feature of the plurality of features can be detected 620 during the bonus building session. In response to detecting 620 the presence of the symbol indicating the multiplier amount on the feature of the plurality of features, the multiplier amount indicated by the detected 620 symbol can be applied 625 to a corresponding symbol in the free game when the bonus-building session ends and the free games begin.

The electronic game can comprise a progressive award and a win meter 340 for the game can indicate an amount of the progressive award. During the bonus building session, a second predefined condition for the plurality of operable features can be detected 630. The second predefined condition can correspond to a win in the gaming session. In response to detecting 630 the second predefined condition for the plurality of operable features, a win amount corresponding to the detected second predefined condition for the plurality of operable features can be added 635 to a win meter 340 for the electronic game.

The bonus-building session can be limited to a predefined number of consecutive bonus-building games in the plurality of bonus-building games available to a player of the electronic game without a win in the consecutive bonus-building games. In response to determining 610 that the first condition, i.e., a win, has not occurred, a further determination 640 can be made as to whether the bonus-building session has expired, e.g., based on the predefined number of consecutive bonus-building games available to a player of the electronic game without a win. In response to determining 640 that no win occurred within the predefined number of consecutive bonus-building games in the plurality of bonus-building games available to a player of the electronic game, the free game can be initiated 645.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for operating an electronic game, the method comprising:

executing, by a processor of a gaming system, a gaming session of an electronic game, the electronic game comprising a plurality of operable features displayed on a display device of the gaming system and each operable feature comprising a plurality of symbols;

detecting, by the processor of the gaming system, a first predefined condition for the plurality of symbols on the plurality of operable features, wherein the first predefined condition corresponds to a win of a free game within the gaming session;

in response to detecting the first predefined condition and prior to initiation of the free game within the gaming session, providing, by the processor of the gaming system, a bonus-building session within the gaming session, the bonus-building session comprising a plurality of bonus-building games, wherein the bonus-building session is limited to a predefined number of consecutive bonus-building games in the plurality of bonus-building games available to a player of the electronic game without a win in the consecutive bonus-building games;

in response to no win occurring within the predefined number of consecutive bonus-building games in the plurality of bonus-building games available to a player of the electronic game without a win in the consecutive bonus-building games, initiating, by the processor to the gaming system, the free game; and in response to a win occurring within the predefined number of consecutive bonus-building games in the plurality of bonus-building games available to a player of the electronic game without a win in the consecutive bonus-building games, continuing, by the processor of the gaming system, the bonus building session until no win occur within the predefined number of consecutive bonus-building games in the plurality of bonus-building games available to a player of the electronic game without a win in the consecutive bonus-building games.

2. The method of claim 1, wherein the electronic game comprises a slots game, wherein the plurality of operable features comprises a plurality of reels, and wherein detecting the predefined condition is based on the plurality of symbols appearing on the plurality of reels.

3. The method of claim 1, further comprising:

detecting, by the processor of the gaming system, a second predefined condition for the plurality of operable features, wherein the second predefined condition corresponds to a win in the gaming session; and in response to detecting the second predefined condition for the plurality of operable features, adding, by the processor of the gaming system, a win amount corresponding to the detected second predefined condition for the plurality of operable features to a win meter for the electronic game.

4. The method of claim 3, wherein the electronic game comprises a progressive award and wherein the win meter indicates an amount of the progressive award.

5. The method of claim 1, wherein the plurality of symbols comprises a symbol indicating a multiplier amount and wherein the method further comprises:

detecting, by the processor of the gaming system, presence of the symbol indicating the multiplier amount on a feature of the plurality of features; and in response to detecting the presence of the symbol indicating the multiplier amount on the feature of the plurality of features, applying, by the processor of the gaming system, the multiplier amount indicated by the detected symbol to a corresponding symbol in the free game.

6. A gaming system comprising:

a display device;

a processor coupled with the display device; and a memory coupled with and readable by the processor and storing therein a set of instructions which, when executed by the processor, cause the processor to:

execute a gaming session of an electronic game, the electronic game comprising a plurality of operable features displayed on the display device of the gaming system and each operable feature comprising a plurality of symbols;

detect a first predefined condition for the plurality of symbols on the plurality of operable features, wherein the first predefined condition corresponds to a win of a free game within the gaming session;

in response to detecting the first predefined condition and prior to initiation of the free game within the gaming session, provide a bonus-building session within the gaming session, the bonus-building session comprising a plurality of bonus-building games, wherein the bonus-building session is limited to a predefined number of consecutive bonus-building games in the plurality of bonus-building games available to a player of the electronic game without a win in the consecutive bonus-building games;

in response to no win occurring within the predefined number of consecutive bonus-building games in the plurality of bonus-building games available to a player of the electronic game without a win in the consecutive bonus-building games, initiate the free game; and in response to a win occurring within the predefined number of consecutive bonus-building games in the plurality of bonus-building games available to a player of the electronic game without a win in the consecutive bonus-building games, continue the bonus building session until no win occur within the predefined number of consecutive bonus-building games in the plurality of bonus-building games available to a player of the electronic game without a win in the consecutive bonus-building games.

7. The gaming system of claim 6, wherein the electronic game comprises a slots game, wherein the plurality of operable features comprises a plurality of reels, and wherein detecting the predefined condition is based on the plurality of symbols appearing on the plurality of reels.

8. The gaming system of claim 6, wherein the instruction further cause the processor to:

detect a second predefined condition for the plurality of operable features, wherein the second predefined condition corresponds to a win in the gaming session; and in response to detecting the second predefined condition for the plurality of operable features, add a win amount corresponding to the detected second predefined condition for the plurality of operable features to a win meter for the electronic game.

9. The gaming system of claim 8, wherein the electronic game comprises a progressive award and wherein the win meter indicates an amount of the progressive award.

10. The gaming system of claim 6, wherein the plurality of symbols comprises a symbol indicating a multiplier amount and wherein the instruction further cause the processor to:

detect presence of the symbol indicating the multiplier amount on a feature of the plurality of features; and in response to detecting the presence of the symbol indicating the multiplier amount on the feature of the plurality of features, apply the multiplier amount indicated by the detected symbol to a corresponding symbol in the free game.

11. A non-transitory, computer-readable medium comprising a set of instructions stored therein which, when executed by a processor, causes the processor to:

execute a gaming session of an electronic game, the electronic game comprising a plurality of operable features displayed on a display device of a gaming system and each operable feature comprising a plurality of symbols;

detect a first predefined condition for the plurality of symbols on the plurality of operable features, wherein the first predefined condition corresponds to a win of a free game within the gaming session;

in response to detecting the first predefined condition and prior to initiation of the free game within the gaming session, provide a bonus-building session within the gaming session, the bonus-building session comprising a plurality of bonus-building games, wherein the bonus-building session is limited to a predefined number of consecutive bonus-building games in the plurality of bonus-building games available to a player of the electronic game without a win in the consecutive bonus-building games;

in response to no win occurring within the predefined number of consecutive bonus-building games in the plurality of bonus-building games available to a player of the electronic game without a win in the consecutive bonus-building games, initiate the free game; and in response to a win occurring within the predefined number of consecutive bonus-building games in the plurality of bonus-building games available to a player of the electronic game without a win in the consecutive bonus-building games, continue the bonus building session until no win occur within the predefined number of consecutive bonus-building games in the plurality of bonus-building games available to a player of the electronic game without a win in the consecutive bonus-building games.

12. The non-transitory, computer-readable medium of claim 11, wherein the instruction further cause the processor to:

detect a second predefined condition for the plurality of operable features, wherein the second predefined condition corresponds to a win in the gaming session; and in response to detecting the second predefined condition for the plurality of operable features, add a win amount corresponding to the detected second predefined condition for the plurality of operable features to a win meter for the electronic game.

13. The non-transitory, computer-readable medium of claim 12, wherein the electronic game comprises a progressive award and wherein the win meter indicates an amount of the progressive award.

14. The non-transitory, computer-readable medium of claim 11, wherein the plurality of symbols comprises a symbol indicating a multiplier amount and wherein the instruction further cause the processor to:

detect presence of the symbol indicating the multiplier amount on a feature of the plurality of features; and in response to detecting the presence of the symbol indicating the multiplier amount on the feature of the plurality of features, apply the multiplier amount indicated by the detected symbol to a corresponding symbol in the free game.

* * * * *